United States Patent
Zakich

(10) Patent No.: US 6,616,441 B1
(45) Date of Patent: Sep. 9, 2003

(54) ALIGNING DEVICE FOR VERTICAL INJECTION MOLDING MACHINE

(75) Inventor: Paul Zakich, Cuyahaoga Falls, OH (US)

(73) Assignee: Van Dorn Demag Corporation, Strongsville, OH (US)

( * ) Notice: Subject to any disclaimer, the term of this patent is extended or adjusted under 35 U.S.C. 154(b) by 0 days.

(21) Appl. No.: 10/124,514

(22) Filed: Apr. 17, 2002

(51) Int. Cl.[7] .............................................. B29C 45/06
(52) U.S. Cl. ........................ 425/574; 425/576; 425/589
(58) Field of Search ................................. 425/574, 576, 425/589, 192 R

(56) References Cited

U.S. PATENT DOCUMENTS

| | | | | |
|---|---|---|---|---|
| 5,855,935 A | * | 1/1999 | Brent et al. ................... | 425/574 |
| 5,975,872 A | * | 11/1999 | Raines et al. ................ | 425/576 |
| 6,402,504 B1 | * | 6/2002 | Hahn et al. .................. | 425/574 |
| 2001/0051193 A1 | * | 12/2001 | Lichtinger ................... | 425/576 |
| 2002/0051830 A1 | * | 5/2002 | Takikawa et al. ........... | 425/576 |
| 2002/0081350 A1 | * | 6/2002 | Elder et al. .................. | 425/576 |

* cited by examiner

Primary Examiner—Tim Heitbrink
(74) Attorney, Agent, or Firm—Fay, Sharpe, Fagan, Minnich & McKee, LLP

(57) ABSTRACT

An injection molding machine with a vertically oriented clamp is equipped with a rotatable table for sequentially processing a plurality of bottom mold halves mounted thereon. An aligning device insures accurate positioning of a bottom mold half in molding relation to a top mold half in the clamp by insuring seating of a locating pin in a locating hole in the table after the table has been rotatably indexed to bring a bottom mold half into alignment with a movable top half. The locating pin is secured to an actuator mounted by a guide rail and runner block to the machine's stationary platen. As the pin is pushed into the locating hole by the actuator, the aligning device linearly moves along the guide rail and the table slightly rotates to allow seating of the locating pin into the locating hole.

14 Claims, 8 Drawing Sheets

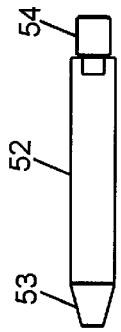
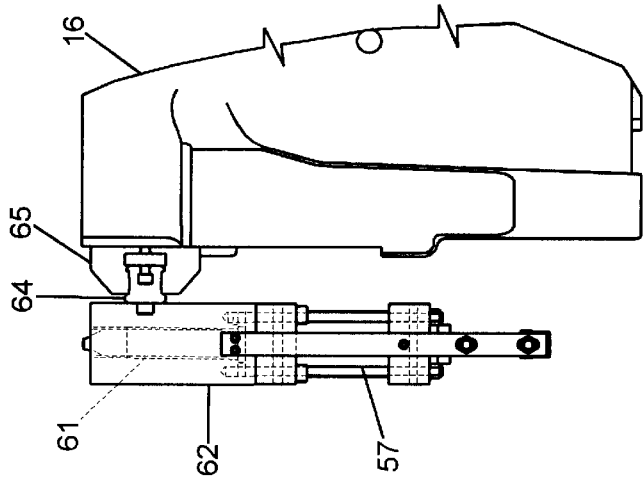
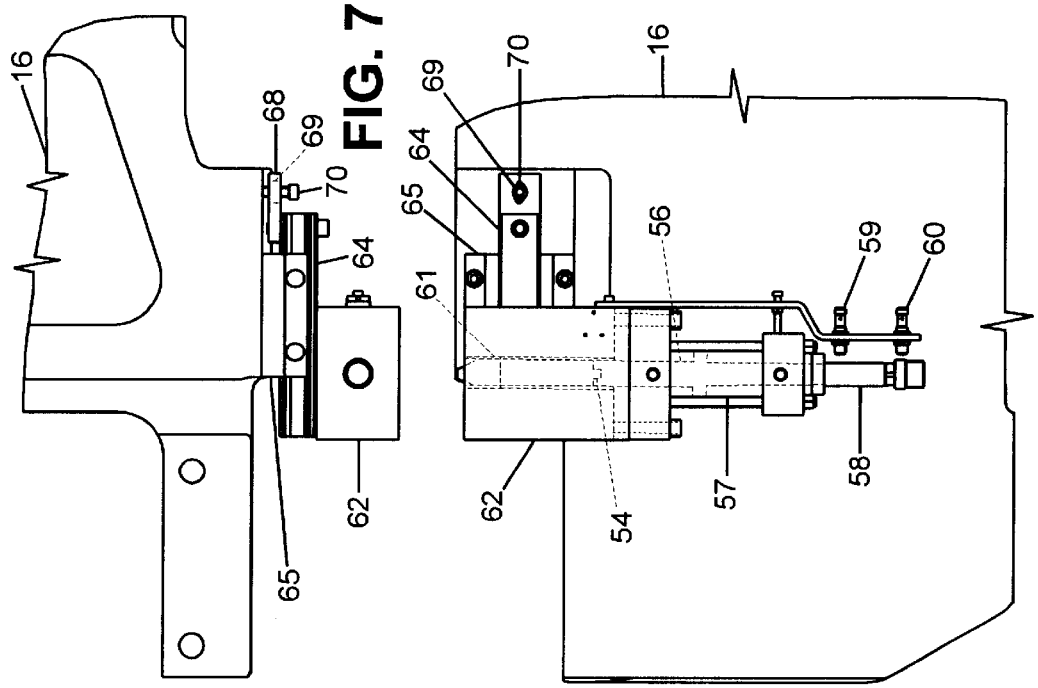

ALIGNING DEVICE FOR VERTICAL INJECTION MOLDING MACHINE

This invention relates generally to injection molding machines and more particularly to an aligning device for a table used on injection molding machines having vertically oriented clamp systems.

BACKGROUND

"Vertical" injection molding machines consist of an injection unit mounted either with a horizontal or vertical orientation and a clamp system oriented vertically to hold the two mold halves together under force sufficient to resist the pressure exerted by the molten plastic. Orientation of the clamp system vertically allows for operational ease as compared with horizontal clamp systems for certain applications including, but not limited to, insert molding and cable connectors.

Vertical injection molding machines can be equipped with a rotating table mounted to rest on the stationary platen. A plurality of lower mold halves are mounted on the table at set positions or stations. The table rotates a set amount to bring a lower mold half into alignment with an upper mold half mounted on the vertically movable platen. The upper mold half mates with the lower mold half, molding material is injected, packed, and the movable platen withdrawn upward. The lower mold half with the molded part therein is now indexed or rotated to another station. At the same time, a "fresh" lower mold half also mounted to the table and previously positioned at some station on the table where it is made ready for molding, is rotated into molding relationship with the upper mold half.

At least two stations are provided in the rotating table, i.e., an injection station and an ejection station. By performing ejection away from the injection station, it may be possible for certain molding applications to reduce cycle time as contrasted to the traditional horizontal injection molding machine which must eject the molded part from the mold cavity. While time is spent indexing the part, that time can be spent in cooling the part which must occur no matter which machine is used before ejection can happen. Usually, the table is equipped with two, three or more stations and the additional stations typically involve stations that set inserts. Thus, a three station table will typically have a separate insert station which occurs after ejection and prior to injection.

All stations are typically automated. At the ejector station, ejector pins, typically positioned beneath the table, dislodge the molded part from the lower mold half and a robotic arm typically transfers the part from mold half to some other station in the plant. Similarly, robotic arms subsequently set inserts into the now empty lower mold half at the insert station. Because of the vertical positioning of the lower mold half with exposed upward cavity, there is an orientation advantage enjoyed by the vertical injection molding machine making it receptive to molding parts requiring a number of intricately placed inserts.

It is to be appreciated that the vertically oriented clamp system with stationary platen fixed to ground lends itself well to high tonnage moldings having relatively heavy mold halves. In addition, advances in molding technology have improved the quality of molded parts produced today and require that the mold halves be precisely aligned. Alignment is conventionally assured by guide pins from one of the mold halves received in guide pin holes in the other mold half. Tolerances between guide pins and guide pin holes are therefore reduced to assure precise alignment of the mating mold halves required (among other things) for precision molding. At the same time, heavy mold parts in a vertical injection mold machine can excessively wear the guide pins if the bottom mold half is not rotated into accurate alignment with the upper, vertically movable mold half.

The problem to which the invention is directed may best be understood by reference to the schematic prior art arrangement depicted in FIG. 1. FIG. 1 shows an upper mold half 1 with guide pins 2 which will vertically descend into mating relationship with a lower mold half 3 mounted on rotatable table 4 by guide pins 2 nesting into guide pin holes 5. Table 4 is also shown in top view between the vertically displaced upper mold half 2 and lower mold half 3. In the top view, the lower mold half at the injection station is designated 3A, at the ejection station 3B, and at the insert station 3C.

Typically, table 4 is rotated about its center by a drive (not shown). A limit or proximity switch is manually set to be actuated when the table rotates to its next successive position. That is when lower mold half 3C rotates to the injection station (shown occupied by lower mold half 3A in FIG. 1), the switch is actuated and the drive stops. For a number of reasons, the switch cannot precisely position the lower mold half at the injection station to assure alignment of guide pins 2.

The prior art has recognized this and has provided an aligning mechanism for the table. This aligning mechanism conceptually comprises a locating hole 6 in table 4 and a power driven locating pin 7. Specifically, one power driven locating pin 7 is provided and table 4 has at each station a locating hole designated 6A, 6B, and 6C in the plan view. When the switch is actuated to stop table rotation, final alignment results by the tapered locating pin 7 fitting into locating hole 6. This causes a slight rotational movement of table 4 and brings lower mold half 3 into better alignment with upper mold half 1 as locating pin 7 is forced upwardly into locating hole 6 than the alignment possible using only a manually set switch. The system described works and has produced acceptable molded parts for years.

For precision molding with good guide pin life, the prior art system is not acceptable. Table 4 is a large diameter and sophisticated jigs and fixtures are used to drill locating holes 6. Size of locating holes 6 and, more importantly, position of locating holes 6, can be held to tolerances of ±0.003". The cumulative effect of hole tolerance in the table can account for 0.010" to 0.012" variation in hole position which is not acceptable. It is to be also recognized that there are variations in other manufacturing tolerances that also contribute to random positioning of the locating holes in the table. For example, variations in the spindle (about which the table rotates) and variations in the gear drive arrangement also account for variations in the position of the locating holes in the table. The cumulative effect of all the tolerances, as well as slippage in the drives, reduce the diametrical size of the locating pin to a dimension not acceptable for the heavy mold, high precision moldings desired to be produced for certain molding applications.

The effect of positional variation in the locating holes is illustrated diagrammatically in exaggerated form by the overlay of locating holes 6A, 6B, 6C shown in the upper right hand corner of FIG. 1. Assume table 4 can be stopped at a precise rotational angle so that no variation in rotation occurs when the table is indexed. Locating hole 6A will occupy the position shown by the solid circle, locating hole 6B will occupy the position shown by the dash circle and locating hole 6C will occupy the position shown by the dot-dash circle. Common area for all three locating holes is shown by cross-hatching and is a reduction in the effective size of locating hole 6. This means that the locating pin can only be the diameter of the reduced locating hole size if the locating pin is to extend through all three locating holes. Reducing the diameter of the locating pin, even in the range of 0.01041, will not provide the desired accurate positioning of the lower mold half relative to the upper, vertically movable mold half.

SUMMARY OF THE INVENTION

Accordingly, it is an object of the invention to overcome the alignment problem discussed above resulting in a reduction of guide pin wear and/or precision molding for certain molding applications.

This object along with other features of the invention is achieved in a vertical injection molding machine which has a lower stationary platen, an upper vertically movable platen with an upper mold half mounted thereon and a table rotatably mounted on the stationary platen and having a plurality of lower mold half stations circumferentially spaced thereabout. Each lower mold half station has a plurality of mounting apertures for variably mounting a lower mold half in each station and the machine is equipped with a drive mechanism for rotating a table from one station to another. An improved aligning mechanism is provided for assuring that the table has stopped at a position whereat the upper and lower mold halves have guide pins and guide pin holes in alignment with one another.

The aligning mechanism includes a locating hole in the table at each station and a locating pin having a tapered tip and a tubular body with a peripheral configuration of size and shape sufficient to establish a slip fit with the locating hole. An actuator is secured to the locating pin for moving the locating pin from an initial position whereat the tapered tip does not extend into the table (preferably from a position below the table) to a located position whereat the body of the locating pin is within the locating hole. Importantly, a guide rail is secured to one of the actuator and the stationary platen and a runner block slidable in the guide rail is mounted to the other one of the actuator and stationary platen whereby movement of the tapered tip into the locating hole by the actuator from the initial position causes movement of the table in a rotating direction and movement of the locating pin in the direction of the guide rail to assure seating of the body of the locating pin into the locating hole notwithstanding variations in manufacturing tolerances as well as other variations causing positional changes of the locating holes from their designed position.

In accordance with a specific aspect of the invention, the locating hole and the pin body are cylindrical and the sliding fit is established as a space between pin body and locating hole not exceeding about 0.002" for any locating hole position.

In accordance with another specific but important aspect of the invention, the rail is preferably straight and oriented at any direction which intersects a radial arc drawn from the center of the table and passing through a locating hole thereby assuring that the center of the pin will coincide with the center of the locating hole by slight rotational table movement caused by the pin entering the hole coupled with linear motion of the runner block within the guide rail.

In accordance with a more specific aspect of the invention, the arrangement includes a mounting block through which the locating pin extends. The mounting block is secured to the actuator at one end thereof and the runner block is secured to a side of the mounting block while the rail isl secured to the stationary platen. A stopper bracket is provided and mounted to the platen adjacent the rail. The stopper bracket has a stop slot extending in the direction of the rail and a stop pin secured to the end of the runner block extends into the stop slot for limiting travel of the runner block in a simple mounting arrangement which can be readily attached to a flat face surface of the stationary platen. Alternatively, the rail is secured to the mounting block and the runner block is secured to the stationary, lower platen.

In general summary, inventive objects, features and advantages of the present invention relate to an aligning mechanism for a vertical injection molding machine equipped with a rotating table which has one or more, or any combination, of the following characteristics or attributes:

a) minimize mold half guide pin wear;

b) enhance precision molding characteristics of the vertical machine;

c) enhance the ability of the vertical machine to accurately mold parts in cavities of large and/or heavy mold halves;

d) suitable for application with heavy rotating tables that must be lifted while rotatably indexed; and/or e) an especially simple and effective mounting arrangement for the locating pin actuator which can be implemented in a cost efficient manner without extensive machining of parts and assembly.

These and other objects of the invention will become apparent to those skilled in the art upon reading and understanding the Detailed Description of the Invention as set forth below taken in conjunction with the drawings.

BRIEF DESCRIPTION OF THE DRAWINGS

The invention may take form in certain parts and in an arrangement of certain parts taken together and in conjunction with the attached drawings which form a part of the invention wherein:

FIG. 7 is a top view of the aligning device;

FIG. 8 is an elevation plan view of the aligning device of the present invention;

FIG. 9A is a side elevation view of the aligning device of the present invention;

FIG. 10 is a plan view of the locating pin of the aligning device; and,

DETAILED DESCRIPTION OF THE INVENTION

Figure 1:
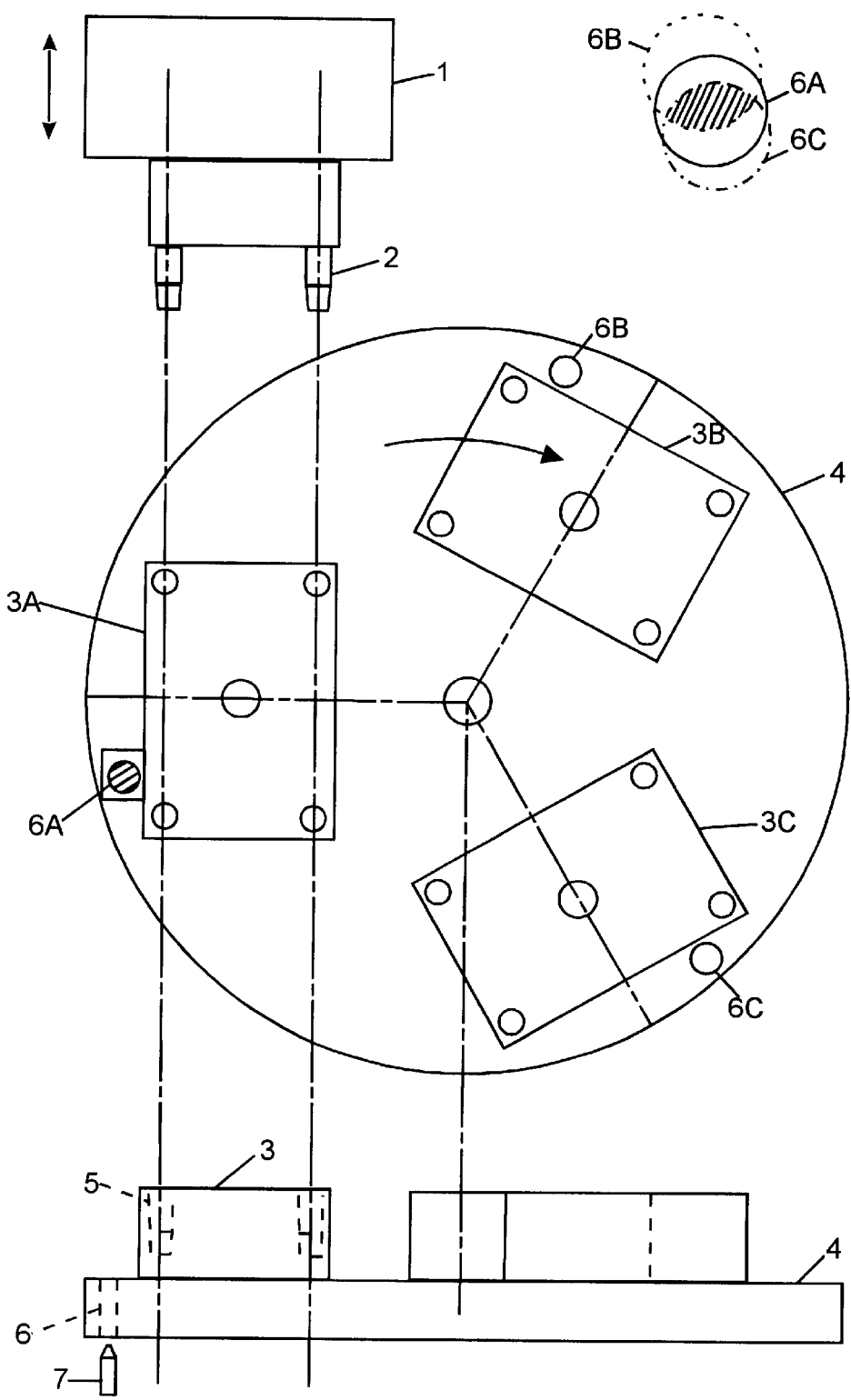
FIG. 1 is a schematic prior art arrangement illustrating the alignment problem overcome by the present invention.
Figure 2:
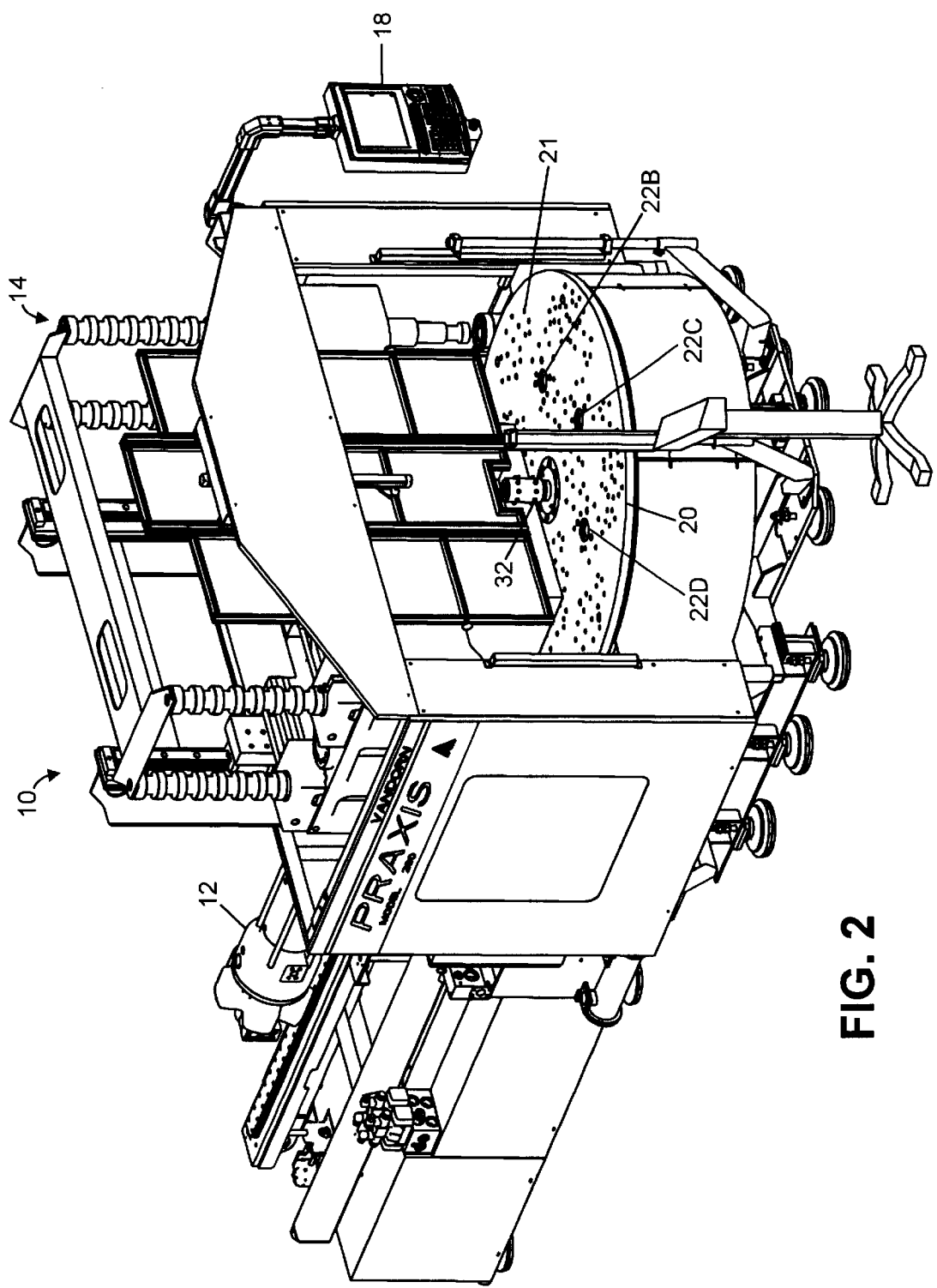
FIG. 2 is a perspective view of a vertical injection molding machine incorporating a rotating table.
Figure 3:
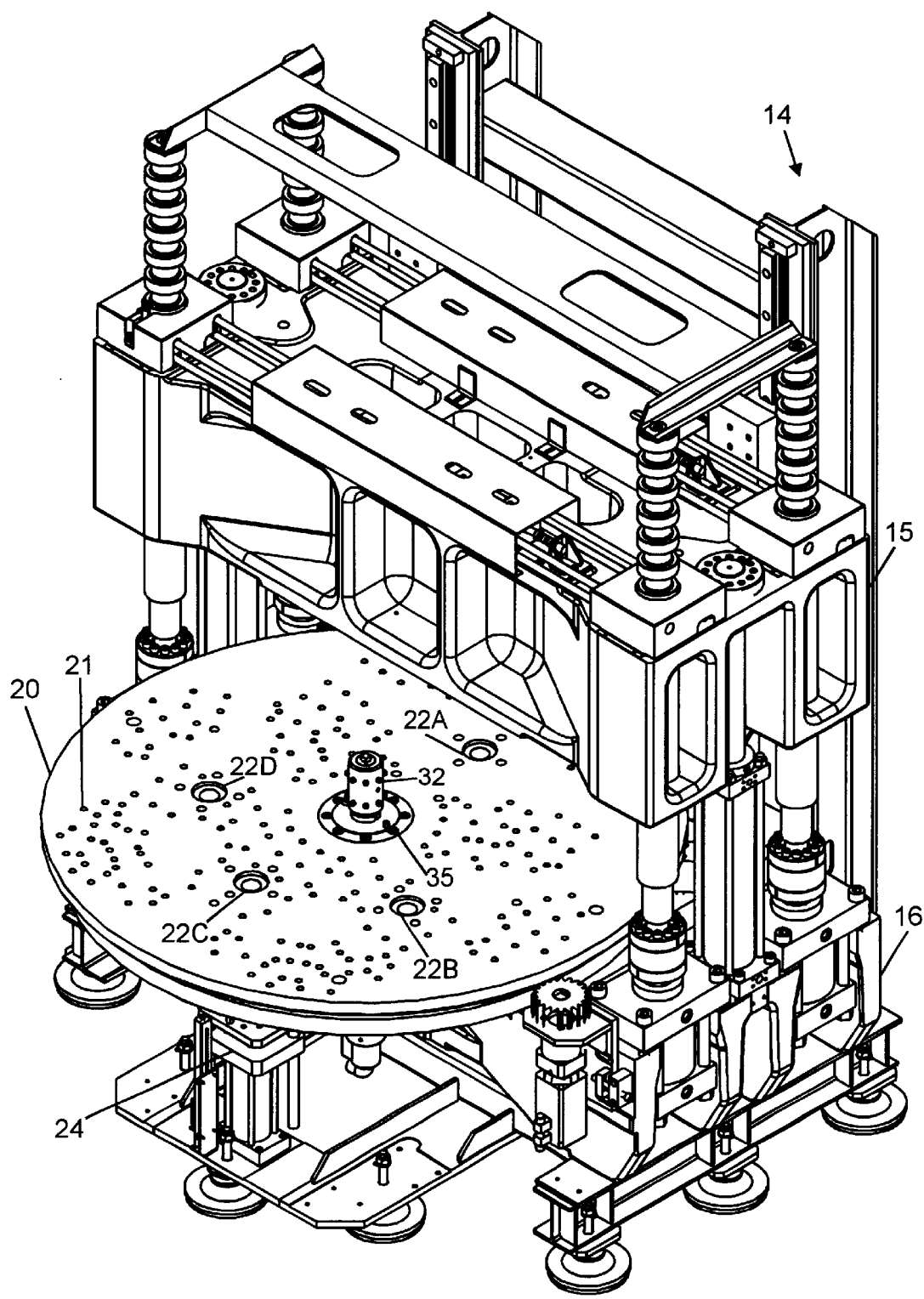
FIG. 3 is a perspective view of the vertically orientated clamp mechanism showing the table incorporated therein.

Referring now to the drawings wherein the showings are for the purpose of illustrating a preferred embodiment of the invention only and not for the purpose of limiting the same, there is shown in FIG. 2 an injection molding machine 10. Injection molding machine 10 has a horizontally inclined injection unit 12 and a vertically oriented clamp unit 14. Clamp unit 14 has an upper movable platen 15 and a lower stationary platen 16. As discussed with reference to FIG. 1, movable platen 15 carries an upper mold half and stationary platen 16 carries the lower mold half. Movable platen 15 is lowered so that the upper and lower mold halves are clamped together for an injection molding cycle at the end of which movable platen 15 is raised so that the lower mold half with the molded part can be removed. This type of injection molding machine, which has a vertically oriented clamp unit 14 will be referred to herein as a "vertical" injection molding machine, although that term is not, per se, recognized in the industry. Any kind of arrangement can be used in the vertical injection molding machine to position a lower mold half on stationary platen 16 underneath an upper mold half and to remove the lower mold half from stationary platen 16 after the injection cycle is completed.

A very common arrangement with vertical injection molding machines is to equip clamp unit 14 with a rotating table 20. Rotating table 20 has a number of mold mounting apertures 21 for bolting lower stationary mold halves in a fixed position on table 20. In addition, the table has several through openings 22 for allowing mechanisms underneath the table to protrude through the table and make contact with the mold cavity in the stationary mold half. For example, an ejector mechanism 24 can have ejector pins pushing through through opening 22 to dislodge the molded part from the stationary mold half where it can be gripped typically by a robotic arm. In table 20 shown in the drawings, there are four through openings 22 designated 22A, 22B, 22C and 22D which are spaced at equal angular increments about table 20.

If the machine is set to have table 20 function as a two-station table, one lower mold half would be secured to table 20 at through opening 22A and another lower mold half would be secured to table 20 at through opening 22C. During setup, the table is precisely rotated in a manner to be described to a position whereat the lower mold half is positioned underneath the upper mold half. The aligning device is actuated to fully seat the locating pin into a locating hole in the table. With the table thus locked in a fixed position, movable platen 15 is slowly lowered so that the guide pins of the upper mold half are seated into the lower mold half. At this point, lower mold half, positioned over through opening 22A, is clamped to table 20. Table 20 is rotated or indexed 180° so that the now clamped bottom mold half is at the position previously occupied by the second bottom mold half over through opening 22C which is now rotated to the position previously occupied by through opening 22A. The locating pin is seated into another locating hole on table 20 and the upper mold half is again lowered slowly by movable platen 15 to cause the guide pins to securely mate with the second lower mold half which is then firmly bolted to mold mounting apertures 21 at that position. The machine is now set to run production cycles in the two-station arrangement described. Each time the table indexes to bring another bottom mold half into position with an upper mold half the locating pin seats into a corresponding locating hole. If the table is to have three stations, then three bottom mold halves will be mounted at equal circumferential or angular increments of 120°. If four stations, then four lower mold halves will be mounted at 90° angular increments. If bottom ejectors are to be used to remove the molded parts, then table 20 must be equipped with a sufficient number of through openings 22 corresponding to the desired stations at the desired angular increments.

Figure 4:
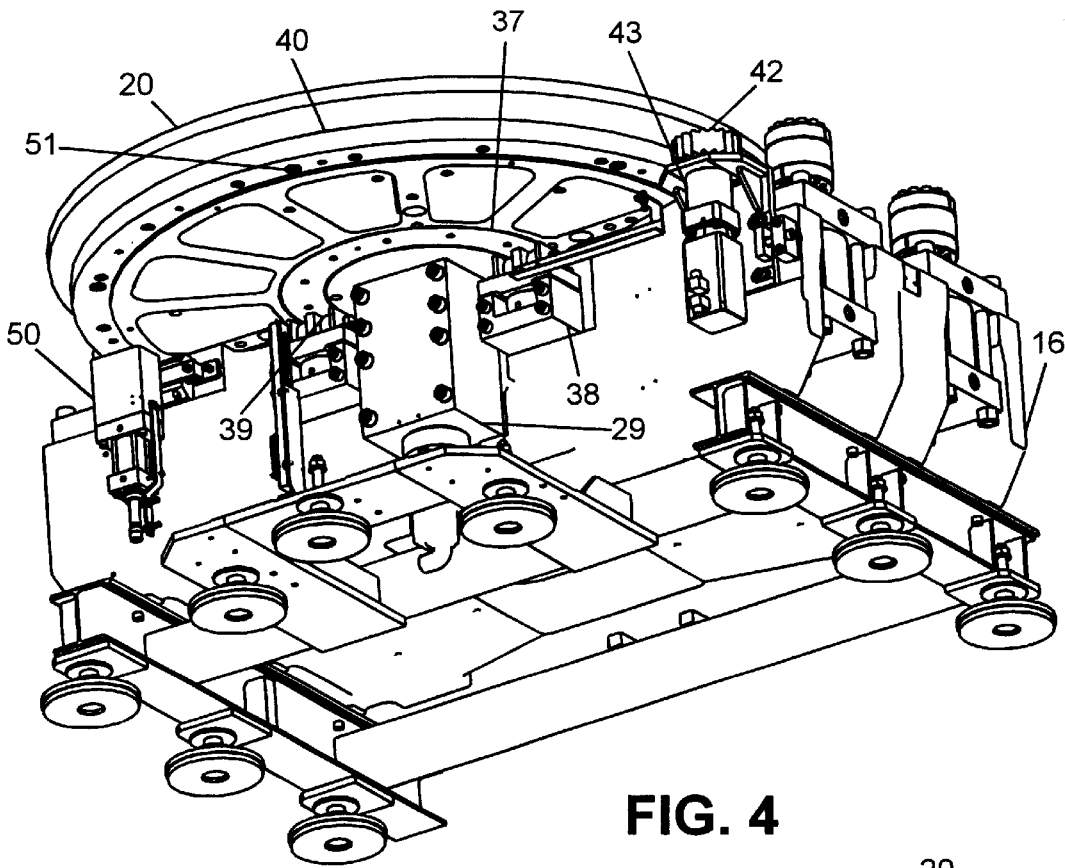
FIG. 4 is an underside perspective view of the stationary platen with rotary table of the vertical injection molding machine.
Figure 5:
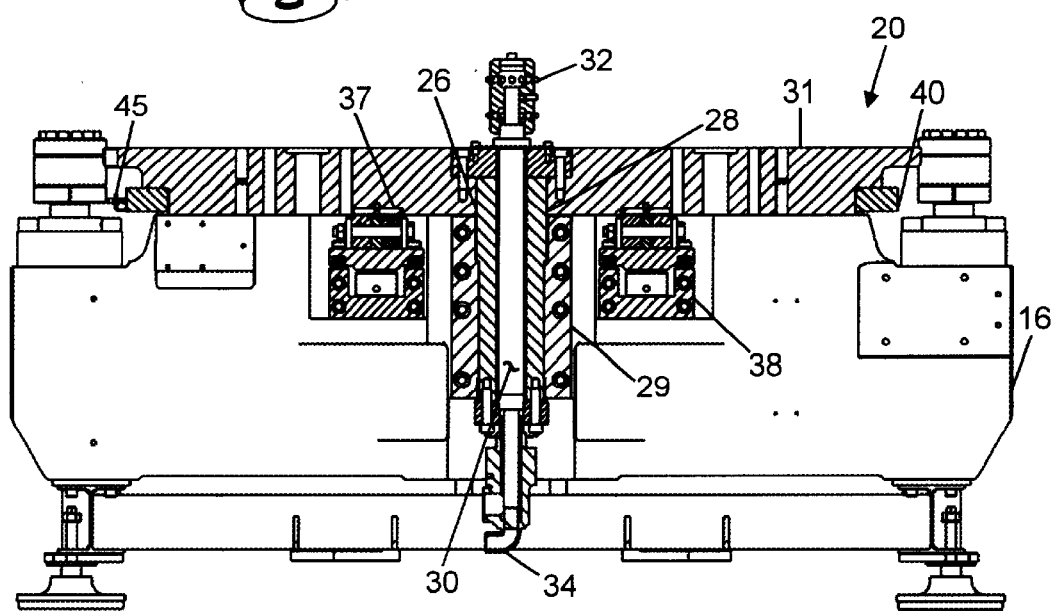
FIG. 5 is a sectioned elevation view of the rotating table of the invention taken through the center of the rotating table.
Figure 6:
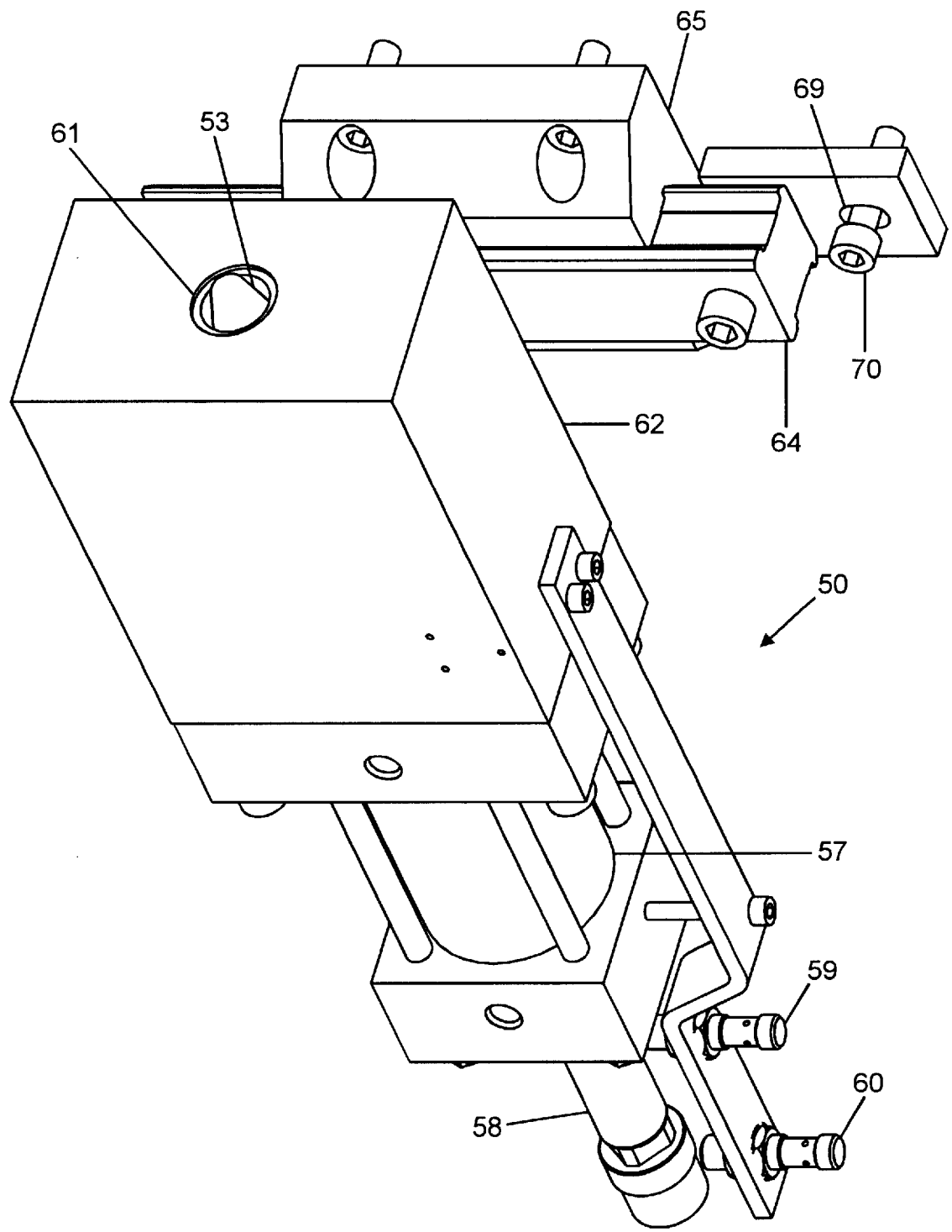
FIG. 6 is a perspective view of the aligning device of the present invention.

In the embodiment shown in FIGS. 4 and 5, table 20 has a central opening 26 into which is mounted a hollow, multi-purpose spindle 28 so that spindle 28 rotates with table 20. Spindle 28 is journaled within a spindle mounting block 29 which, in turn, is fixed to stationary platen 16. Spindle 28 has a hollow bore 30 which extends above the top surface 31 of table 20 and is in fluid communication at its top closed end with a plurality of fluid connections 32 and at its bottom end receives a fluid supply tube 34. Details of spindle 28 are not shown in the drawings or described since they are not necessary to the functioning of the invention. It is sufficient to note that multi-purpose spindle 28 allows table 20 to rotate and can supply fluid at connections 32 and also at connections 35 for mold temperature control and hydraulic functions.

In the preferred embodiment, table 20 has an annular roller, wear plate track 37 spaced radially outwardly from and circumscribing spindle mounting block 29. Mounted on each side of spindle mounting block 29 is a hydraulic lift actuator 38 which, when actuated, can raise or lower spherical rollers 39 which, in turn, are spring biased to always remain in contact with roller track 37. Thus, when table 20 is to be rotated so that a lower mold half is indexed to its next station, lift actuators 38 raise the table, vis-a-vis rollers 39, which roll on roller track 37 while the table rotates about spindle 28. When a station is reached, lift actuators 38 lower table 20 so that it rests on stationary platen 16 and can support the clamping forces exerted by clamp unit 14. Typically, table 20 slides on stationary platen 16 as it rotates. The invention will function whether table 20 is lifted, as in the preferred embodiment, or slides as in the conventional manner.

Table 20 has a ring gear 40 (ring teeth not shown for drawing clarity) beneath table's top surface 31 and adjacent the outer periphery of table 20 which is in toothed engagement with a pinion gear 42 driven by an electric or hydraulic drive motor 43 under the control of the machine's programmable controller 18. Teeth length of pinion gear 42 is sufficient to maintain toothed engagement with ring gear 40 whether table 20 is lifted or lowered. In addition, a proximity switch 45 (alternatively, a manually set limit switch) is set to be tripped or actuated by an adjustable rod fixed to table 20 at each indexed station. Switch 45 assures that table rotation stops.

As best shown in FIG. 4, the aligning device 50 of the invention is mounted to stationary platen 16 underneath table 20 which has any number of locating holes 51 drilled into the underside of ring gear 40. Locating holes are preferably positioned in ring gear 40. The function of aligning device 50 is the same as that of the prior art aligning device. Proximity switch 45 stops rotation of motor 43 at a position whereat an empty lower mold half is moved into molding relationship with the upper mold half on movable platen 15. While table 20 can be stopped at precise positions, that position is not sufficiently assured to insure the desired alignment tolerances of the mold half guide pins. Accordingly, aligning device 50 is actuated so that its locating pin 52 fits into a corresponding locating hole 51 for that particular work station. This brings the guide pins of one mold half into alignment with the guide holes in the opposing mold half. After injection, table 20 is now rotated by motor 43 so that the next, now empty, lower mold half is positioned underneath the upper mold half and the aligning device again actuated to assure alignment of the mold half guide pins. The aligning device of the invention assures that locating pin 52 fully seats into tight alignment with a corresponding locating hole 51 at each station. It doesn't matter whether locating holes 51 are in a precise geometric alignment with one another. What does matter is that locating pin 52 can fully seat into all locating holes 51 in a consistently, repeatable manner.

Referring now to FIGS. 6, 7, 8, 9A and 10. Locating pin 52 has a tapering conical tip 53 at its entrance end and a threaded end 54 at its opposite end. In the preferred embodiment, locating pin 52 has a tapering tip of about 15°, a diameter of about 1" for its tubular position which seats into a locating hole 51 and is a high alloyed, case carburized steel. Locating pin threaded end 54 screws into a threaded opening in a piston rod 56 of a hydraulic cylinder 57. (Alternatively, an electric actuator can be used in place of the hydraulic actuator.) Piston rod 56 has a tail extension 58 protruding from the opposite end of hydraulic cylinder 57 for actuating up-down proximity switches 59, 60 respectively. Piston rod 56 and locating pin 52 move within a through bore 61 extending through a cylinder mounting block 62 fixed as shown to hydraulic cylinder 57. Preferably, a bushing within through bore 61 provides a diametrical clearance or slip fit between aligning bore 61 and locating pin 52 of about 0.002". Note that this is the tolerance that aligning device 50 repeatedly achieves between mold half guide pins and guide holes.

In the preferred embodiment, cylinder mounting block 62 is fastened to a guide rail 64 and guide rail 64 slides within a runner block 65, in turn, secured to stationary platen 16. Guide rail 64 and runner block 65 are conventional guide rail systems which typically employ ball bearings in the roller block to assure easy and precise movement of the block along the rail track while fixing the block to the track. In the preferred embodiment, a conventional system marketed under the brand name Ball Rail® system is utilized. Other conventional rail systems could be utilized. To provide a limit for the movement of guide rail 64 relative to stationary runner block 65 a stopper bracket 68 is fixed to an end of guide rail 64. Stopper bracket 68 has a slot 69 through which a stop fastener 70 threaded into lower stationary platen 16 is provided. The length of slot 69 determines the travel of guide rail 64 relative to runner block 65 and is sufficient to maintain the position of locating pin in the vicinity of the locating holes in the table.

Figure 9B:
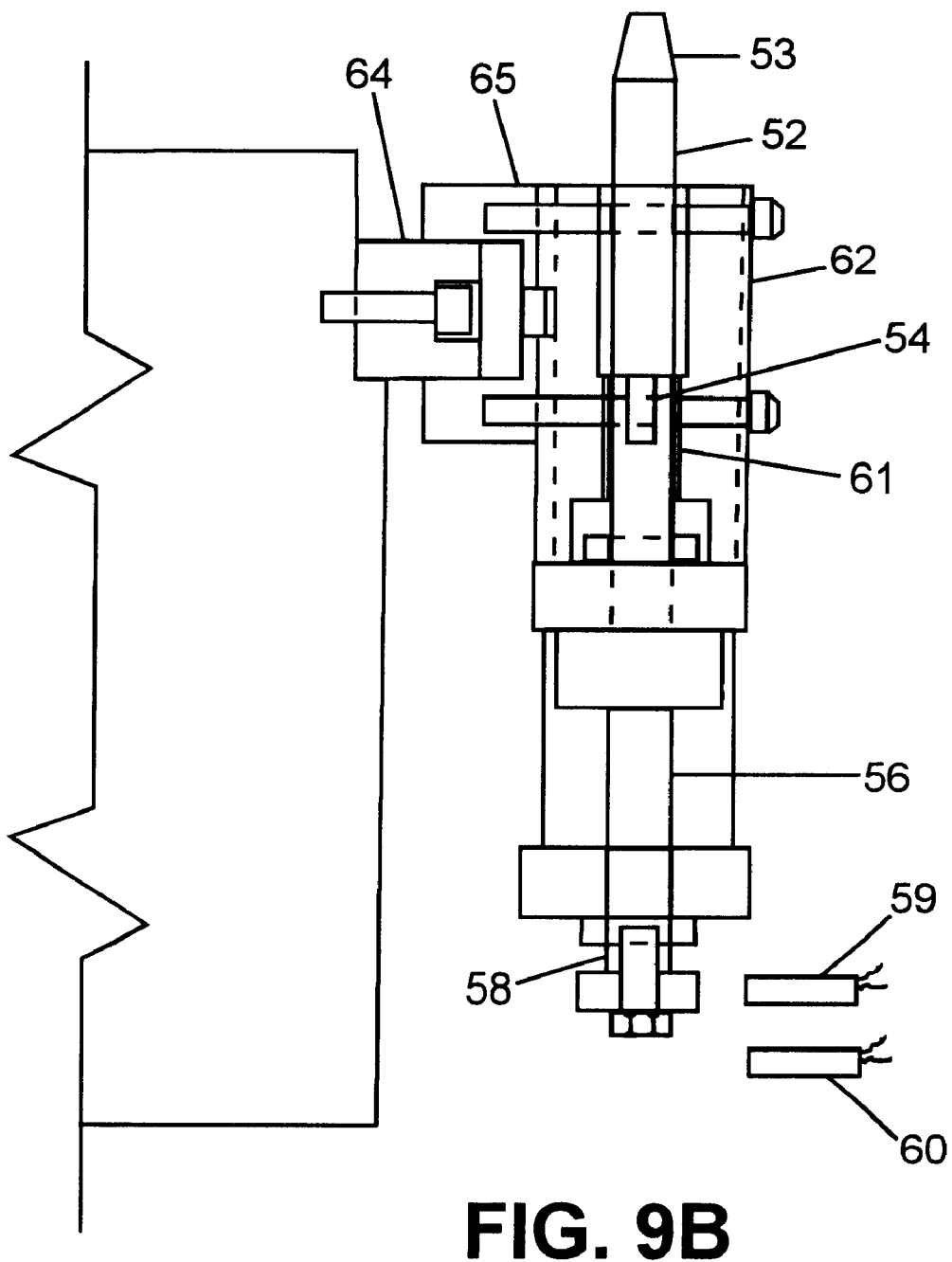
FIG. 9B is a side elevation view of an alternative embodiment of the aligning device of the present invention.

Those skilled in the art will readily recognize that the position of guide rail 64 and runner block 65, which allows linear motion of aligning device 50, can be reversed. Thus, as shown in FIG. 9B, guide rail 64 is fixed to lower stationary platen 16 and runner block 65 is fixed to cylinder mounting block 62.

Figure 11A:
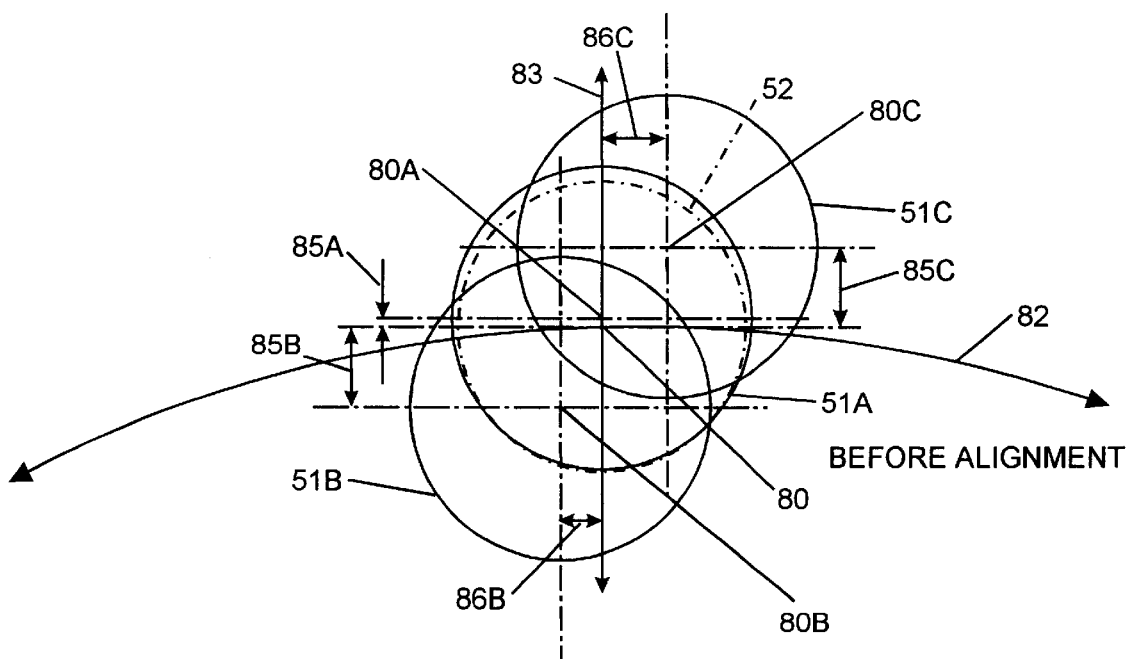
FIGS. 11A and 11B are schematic representations depicting the aligning characteristics of the present invention before and after alignment, respectively.
Figure 11B:
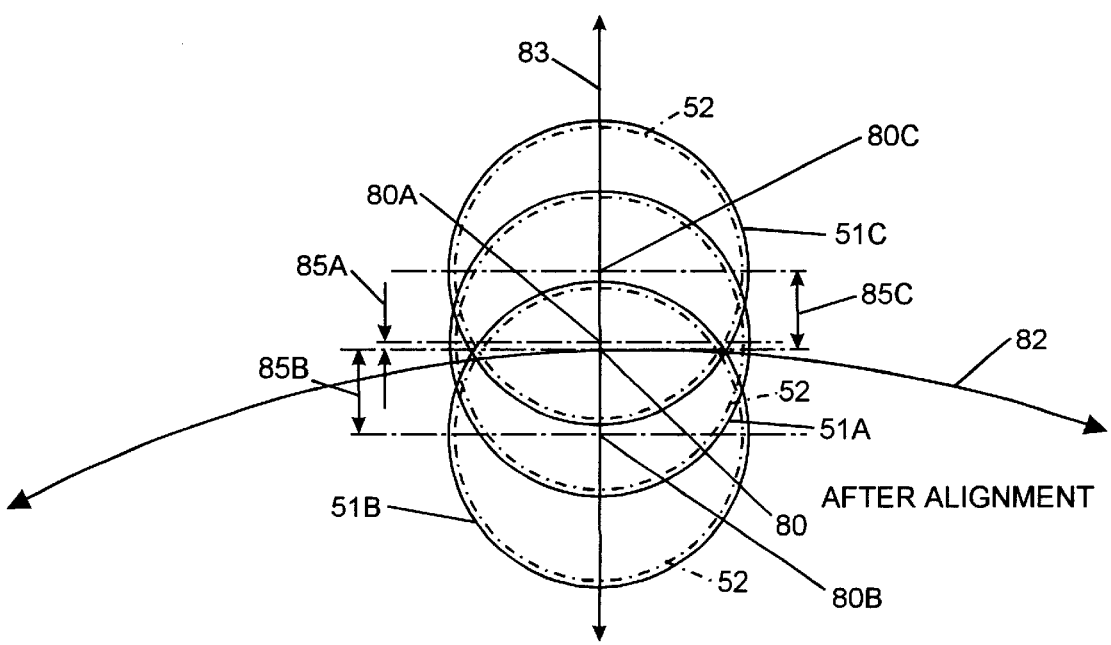

Reference should now be had to FIG. 11A which shows hole condition before alignment (after table rotation of 120°) and FIG. 11B which shows condition after alignment. Assume that table 20 has three work stations spaced apart at 120° increments so that locating pin 52 slides into and is positioned within three different locating holes 51A, 51B and 51C. Assume that pin center point 80 is the theoretical center of conical tip 53 of locating pin 52 and that table 20 can be precisely stopped (by proximity switch 45) after 120° of rotation so that locating pin 52 is initially positioned at pin center 80 at each station. For reasons discussed in the Background, the center of locating holes 51A, 51B, 51C are not precisely positioned at pin center point 80. Thus, the center of locating hole 51A is designated by reference numeral 80A. The center of locating hole 51B is designated 80B and the center of locating hole 51C is designated 80C. Rotational movement of table 20 passing through pin center point 80 is indicated by curved arrow 82.

In the example given in FIG. 11A, center 80A of first locating hole 51A (indicative of a first work station) is simply linearly offset from pin center point 80. It is linearly offset a distance indicated by reference numeral 85A. When the table is rotated 120° to the first position where locating hole 51A is at initially (FIG. 11A), all that is necessary for locating pin 52 to seat into locating hole 50A (FIG. 11 B) is for aligning device 50 to move linearly along rail line 83 the linear distance 85A. Rail line 83 is the path of the pin linear motion.

When the table is rotated 120° to the second position where locating hole 51B is at initially, the center 80B of second locating hole 51B, is to the left of pin moving line 83 a distance shown by reference numeral 86B and down from pin center 80 a distance shown by reference numeral 85B when viewing FIG. 11A. For pin 52 to seat into second locating hole 51B as shown in FIG. 11B, the table must angularly move or rotate in the direction of arc 82 to the left a distance equal to the 86B distance and aligning device must move linearly down along rail line 83 a distance equal to the 85B distance. Similarly, when the table rotates 120° to the third position where locating hole 51C is initially positioned as shown in FIG. 11A, center 80C is to the right of pin moving line 83 a distance indicated by reference numeral 86C and up from center pin point 80 a distance equal to reference numeral 85C. For pin 52 to seat into third locating hole 51C as shown in FIG. 11A, the table must rotate in the direction of arc 82 a distance equal to that shown by reference numeral 86C and aligning device 50 must linearly move along rail line 83 a distance equal to that shown by reference numeral 85C.

Rail line 83 is fixed because aligning device 50 is secured to stationary platen 16. It's correct position is shown in FIG. 11B. It should be apparent that table rotation (in the direction of arc 82) and aligning device linear movement (along rail line 83) occur simultaneously as conical tip 53 of locating pin 52 travels into locating hole 51. In practice, the rotation and linear movements will occur in small incremental movements as the pin seats into the hole. It should also be noted that, geometrically, any orientation of rail line 83 is acceptable so long as the line intersects radial arc 82.

The invention has been described with reference to a preferred and alternative embodiment. Obviously, modifications and alterations will occur to those skilled in the art upon reading and understanding the Detailed Description of the Invention set forth herein. It is intended to include all such modifications and alterations insofar as they come within the scope of the present invention.

Having thus defined the invention, it is claimed:

1. In a vertical injection molding machine having a stationary platen, a vertically movable platen with a movable mold half mounted thereon, a table rotatably mounted on said stationary platen and having a plurality of stationary mold half stations circumferentially spaced thereabout, each stationary mold half station having a plurality of mounting apertures for variably mounting a stationary mold half in each station, and a drive mechanism for rotating said table from one station to another, the improvement comprising:

a locating hole in said table at each station;

a locating pin having a tapered tip and a tubular body having a peripheral configuration of size and shape sufficient to establish a slip fit with said locating hole;

an actuator secured to said locating pin for moving said locating pin from an initial position whereat said tapered tip does not extend into said table to a located position whereat said body of said locating pin is within said locating hole;

a guide rail secured to one of said actuator and said stationary platen; and a runner block slidable in said guide rail mounted to the other one of said actuator and said stationary platen whereby movement of said tapered tip into said locating hole by said actuator from said initial position causes movement of said table in a rotating direction and movement of said locating pin in the direction of said guide rail to assure seating of said body of said locating pin into said locating hole.

2. The vertical injection molding machine of claim 1 further including a stop bracket adjacent one of said runner block and said guide rail for limiting motion of said actuator.

3. The vertical injection molding machine of claim 2 wherein said locating hole and said pin body are cylindrical and the sliding fit is established as a space between pin body and locating hole not exceeding about 0.002" for any locating hole position.

4. The vertical injection molding machine of claim 2 wherein said rail is straight and oriented at a direction which intersects a radial arc drawn from the center of said table and passing through a locating hole.

5. The vertical injection molding machine of claim 4 further including a mounting block through which said locating pin extends, said mounting block secured to said actuator at one end thereof, said runner block secured to a side of said mounting block, and said rail secured to said stationary platen.

6. The vertical injection molding machine of claim 4 further including a mounting block through said locating pin extends, said mounting block secured to said actuator at one end thereof, said rail secured to a side of said mounting block and said runner block secured to said stationary platen.

7. The vertical injection molding machine of claim 5 wherein said stop bracket is mounted to said platen adjacent said rail and has a stop slot extending in the direction of said rail and a stop pin secured to the end of said runner block extending into said stop slot limiting movement of said runner block in said rail.

8. The vertical injection molding machine of claim 7 wherein said locating holes equal or exceed two in number and are adjacent the outer periphery of said table.

9. A vertical injection molding machine comprising:

an injection unit;

a vertically movable clamp platen;

a stationary clamp platen;

a rotatable table resting on said stationary platen in load bearing relation when said injection unit is actuated;

an upper mold half mounted to said movable platen and a plurality of lower mold halves mounted to said table at set circumferentially spaced stations, one of said upper and lower mold halves having guide pins protruding therefrom and the other one of said upper and lower mold halves having guide pin holes for receiving said guide pins;

a rotating mechanism for rotating said table to cause a lower mold half at any given station to move into confronting molding relationship with said upper mold half;

an aligning mechanism for assuring said table has stopped at a position whereat said upper and lower mold halves have guide pins and guide pin holes in alignment, said aligning mechanism including a locating hole in said table at each station;

a locating pin having a tapered tip and a tubular body having a peripheral configuration of size and shape sufficient to establish a slip fit with said locating hole;

an actuator secured to said locating pin for moving said locating pin from an initial position whereat said tapered tip does not extend into said table to a located position whereat said body of said locating pin is within said locating hole;

a guide rail secured to one of said actuator and said stationary platen, and a runner block slidable in said guide rail mounted to the other one of said actuator and said stationary platen whereby movement of said tapered tip into said locating hole by said actuator from said initial position causes movement of said table in a rotating direction and movement of said locating pin in the direction of said guide rail to assure seating of said body of said locating pin into said locating hole.

10. The injection molding machine of claim 9 further including a stop bracket adjacent one of said runner block and said guide rail for limiting motion of said actuator.

11. The injection molding machine of claim 10 further including a mounting block through which said locating pin extends, said mounting block secured to said actuator at one end thereof, said runner block secured to a side of said mounting block and said rail secured to said stationary platen.

12. The injection molding machine of claim 10 wherein said rail is straight and oriented at a direction which intersects a radial arc drawn from the center of said table and passing through a locating hole.

13. The injection molding machine of claim 10 further including a mounting block through said locating pin extends, said mounting block secured to said actuator at one end thereof, said rail secured to a side of said mounting block and said runner block secured to said stationary platen.

14. The injection molding machine of claim 13 wherein said locating hole and said pin body are cylindrical and the sliding fit is established as a space between pin body and locating hole not exceeding about 0.002" for any locating hole position.

* * * * *